United States Patent
Calabrese et al.

(10) Patent No.: US 12,218,598 B2
(45) Date of Patent: Feb. 4, 2025

(54) QUASI-RESONANT ISOLATED VOLTAGE CONVERTER

(71) Applicant: TEXAS INSTRUMENTS INCORPORATED, Dallas, TX (US)

(72) Inventors: Giacomo Calabrese, Freising (DE); Nicola Bertoni, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/828,424

(22) Filed: May 31, 2022

(65) Prior Publication Data

US 2023/0412083 A1   Dec. 21, 2023

(51) Int. Cl.
  *H02M 3/335*   (2006.01)
  *H02M 1/44*   (2007.01)
(52) U.S. Cl.
  CPC ......... *H02M 3/33569* (2013.01); *H02M 1/44* (2013.01)
(58) Field of Classification Search
  CPC ............................ H02M 3/33569; H02M 1/44
  See application file for complete search history.

(56) References Cited

U.S. PATENT DOCUMENTS

| | | | | |
|---|---|---|---|---|
| 5,228,106 A * | 7/1993 | Ang | .................. | G11C 7/065 365/208 |
| 5,539,630 A * | 7/1996 | Pietkiewicz | ........ | H02M 3/3372 363/17 |
| 5,546,295 A * | 8/1996 | Prete | .................. | H02M 3/33571 363/71 |
| 5,847,941 A * | 12/1998 | Taguchi | .................. | H02M 1/34 363/21.03 |
| 6,208,554 B1 * | 3/2001 | Phan | .................... | G11C 11/4125 365/181 |
| 6,433,589 B1 * | 8/2002 | Lee | .................. | H03K 3/356139 326/119 |
| 6,633,285 B1 * | 10/2003 | Kigo | .................... | G09G 3/2965 345/55 |

(Continued)

OTHER PUBLICATIONS

Chen, Baoxing. "iCoupler® Technology with isoPower™ Technology: Signal and Power Transfer Across Isolation Barrier Using Microtransformers." 2006 Analog Devices, Inc. pp. 1-4.

*Primary Examiner* — Yusef A Ahmed
(74) *Attorney, Agent, or Firm* — Michelle F. Murray; Frank D. Cimino

(57) ABSTRACT

A converter includes a transformer having a primary and secondary windings. The primary winding has first and second winding terminals. A switch network has first-sixth switch network terminals. The first switch network terminal couples to the first winding terminal. The second switch network terminal couples to the second winding terminal. A first transistor has a first control input and first and second current terminals. The second current terminal couples to the third switch network terminal. A second transistor has a second control input and third and fourth current terminals. The fourth current terminal couples to the fourth switch network terminal. A third transistor has a third control input and fifth and sixth current terminals. The fifth current terminal couples to the fifth switch network terminal. A fourth transistor has a fourth control input and seventh and eighth current terminals. The seventh current terminal couples to the sixth switch network terminal.

17 Claims, 4 Drawing Sheets

(56) References Cited

U.S. PATENT DOCUMENTS

| | | | | |
|---|---|---|---|---|
| 7,199,617 | B1* | 4/2007 | Schrom | H03K 19/018528 327/333 |
| 10,312,791 | B1* | 6/2019 | Ker | H03K 3/356113 |
| 10,498,289 | B2* | 12/2019 | Shu | H03B 5/02 |
| 10,811,975 | B1* | 10/2020 | Bala | H02M 3/155 |
| 11,581,796 | B2* | 2/2023 | Yan | H02M 1/0025 |
| 2003/0052344 | A1* | 3/2003 | Hoffmann | H10B 12/50 257/273 |
| 2004/0066214 | A1* | 4/2004 | Choe | H03K 19/1738 326/121 |
| 2004/0165462 | A1* | 8/2004 | Morgan | G11C 7/065 365/205 |
| 2005/0285658 | A1* | 12/2005 | Schulmeyer | H03K 25/02 327/333 |
| 2008/0165583 | A1* | 7/2008 | Schatzberger | G11C 14/00 365/185.05 |
| 2014/0062545 | A1* | 3/2014 | Dai | H03M 1/0818 327/142 |
| 2014/0062621 | A1* | 3/2014 | Dai | H03M 1/183 333/216 |
| 2014/0145777 | A1* | 5/2014 | Ma | H03K 3/356165 327/333 |
| 2015/0180362 | A1* | 6/2015 | Mauder | H02M 7/217 363/127 |
| 2015/0311785 | A1* | 10/2015 | Kim | H03F 1/0255 327/536 |
| 2015/0357022 | A1* | 12/2015 | Hush | G11C 11/4093 365/72 |
| 2016/0072390 | A1* | 3/2016 | Akutagawa | H02M 3/33507 363/17 |
| 2016/0094136 | A1* | 3/2016 | Fu | H02M 3/33584 363/21.02 |
| 2016/0233776 | A1* | 8/2016 | Nielsen | H02M 3/33546 |
| 2017/0264288 | A1* | 9/2017 | Wu | H03K 17/102 |
| 2017/0294843 | A1* | 10/2017 | Norisada | H02M 3/33546 |
| 2018/0205319 | A1* | 7/2018 | Zhuo | H02M 3/33523 |
| 2019/0089262 | A1* | 3/2019 | Granato | H02M 3/33592 |
| 2019/0089263 | A1* | 3/2019 | Granato | H02M 3/33573 |
| 2019/0229632 | A1* | 7/2019 | Ishibashi | H02M 3/33576 |
| 2019/0229633 | A1* | 7/2019 | Perreault | H02M 3/33584 |
| 2019/0363636 | A1* | 11/2019 | Komma | H02M 3/33507 |
| 2020/0366184 | A1* | 11/2020 | Watanabe | H02M 1/083 |
| 2020/0366198 | A1* | 11/2020 | Watanabe | H02M 3/33546 |
| 2020/0366213 | A1* | 11/2020 | Watanabe | H02M 3/33584 |
| 2020/0412237 | A1* | 12/2020 | Dai | H02M 3/155 |
| 2020/0412238 | A1* | 12/2020 | Zhu | H02M 1/4241 |
| 2021/0057980 | A1* | 2/2021 | Shiomi | H02M 3/1588 |
| 2021/0135581 | A1* | 5/2021 | Rajashekara | H02M 1/4241 |
| 2021/0194374 | A1* | 6/2021 | Deng | H02M 1/4258 |
| 2022/0077788 | A1* | 3/2022 | Singh | H02M 3/003 |
| 2022/0231618 | A1* | 7/2022 | Yan | H02M 1/1584 |
| 2022/0247303 | A1* | 8/2022 | Jin | H02M 1/1584 |
| 2022/0255456 | A1* | 8/2022 | Jin | H02M 3/33592 |
| 2022/0407425 | A1* | 12/2022 | Calabrese | H02M 1/123 |
| 2022/0407426 | A1* | 12/2022 | Takeshita | H02M 1/0054 |
| 2023/0155495 | A1* | 5/2023 | Liang | H02M 3/1582 323/235 |
| 2023/0179162 | A1* | 6/2023 | Mehr | H03F 1/565 330/254 |
| 2024/0007006 | A1* | 1/2024 | Ji | H02M 3/01 |

* cited by examiner

QUASI-RESONANT ISOLATED VOLTAGE CONVERTER

BACKGROUND

A voltage converter is an electrical circuit (e.g., an integrated circuit, "IC") that receives an input voltage at one voltage level and generates an output voltage typically at a different voltage level. Some voltage converters are isolated converters which include a galvanic barrier between the input and the output. A galvanic isolation barrier lacks a direct electrical connection. One type of galvanic isolation barrier is a transformer, which has two inductors—a primary coil for the input side of the converter and a secondary coil for the output side of the converter—and there is no direct electrical connection between the primary and secondary coils. Isolated voltage converters have a wide variety of applications such as in controller area networks (CANs), power supply start-up bias and gate drives, isolated sensor interfaces, etc.

SUMMARY

In one example, an isolation converter includes a transformer having a primary winding and a secondary winding, the primary winding having first and second winding terminals. A switch network is included and has first, second, third, fourth, fifth, and sixth switch network terminals. The first switch network terminal is coupled to the first winding terminal, and the second switch network terminal is coupled to the second winding terminal. A first transistor has a first control input and first and second current terminals, with the second current terminal being coupled to the third switch network terminal. A second transistor has a second control input and third and fourth current terminals, with the fourth current terminal being coupled to the fourth switch network terminal. A third transistor has a third control input and fifth and sixth current terminals, with the fifth current terminal being coupled to the fifth switch network terminal. A fourth transistor has a fourth control input and seventh and eighth current terminals, with the seventh current terminal coupled to the sixth switch network terminal.

DETAILED DESCRIPTION

The example embodiments described herein are directed to a voltage converter. In one example, the voltage converter is an isolated voltage converter including a transformer that isolates a "primary" side from a "secondary" side of the converter. The isolated voltage converter is configured to convert an input direct current (DC) voltage received on the primary side to a different (or the same) DC voltage on the secondary side using the transformer. The primary side includes a power stage that may include a switch network that receives the DC input voltage and produces a time-varying voltage to the primary winding of the transformer. The time-varying voltage on the primary winding of the transformer induces a time-varying current/voltage in the secondary winding of the transformer. The secondary side includes a rectifier to convert the time-varying current/voltage from the secondary winding to an approximately DC output voltage. The DC output voltage may have some degree of ripple within the specifications for the application of the voltage converter. Because the converter is an isolated voltage converter, the output voltage is referred to herein as an isolated output voltage (Viso).

The magnitude of the energy transfer through the converter is influenced by, among other things, the inductances of the transformer's primary and secondary windings, the resonant capacitance, and the switching frequency of the primary side power stage. In one embodiment, the isolated voltage converter is an "integrated" isolated power converter meaning that the components of the converter including the transformer are formed as an integrated circuit on the same semiconductor die or in the same package containing multiple dies. That being the case, the transformer is small and thus the inductance of its windings are relatively small and the coupling coefficient of the transformer is also relatively small. That the transformer may be a relatively poor performance transformer can be compensated by switching at higher frequencies and by implementing a desired magnitude of the resonant capacitance. Also, to the extent that a circuit to implement the power stage on the primary side has a common mode voltage with a substantially large higher frequency component, the converter may generate substantial electromagnetic interference (EMI). The EMI results from the time-varying common mode voltage causing the isolated ground planes on the primary and secondary sides to radiate electromagnetic energy. The embodiments described herein provide example implementations of the power stage to reduce EMI.

Figure 1:
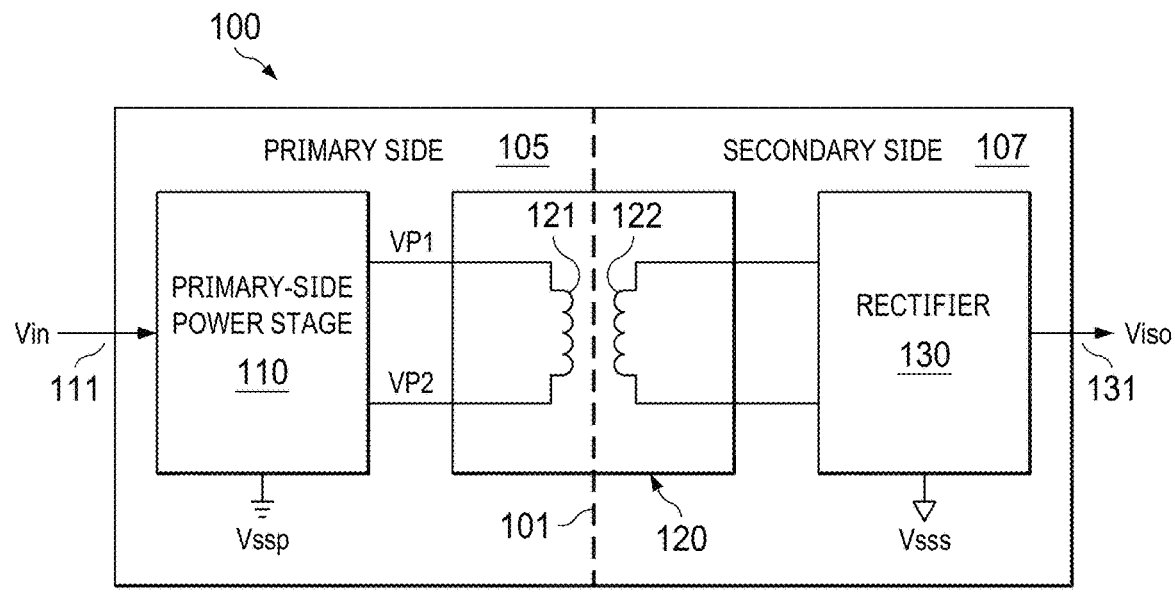
FIG. 1 is a schematic diagram of a quasi-resonant voltage converter, in accordance with an example.

FIG. 1 is a block diagram of an isolation voltage converter 100 in accordance with an example embodiment. The isolation voltage converter 100 has a primary side 105 and a secondary side 107. The isolated voltage converter 100 includes a transformer 120 that is operable as an isolation transformer to galvanically isolate the primary side 105 from the secondary side 107. The dashed line 101 delineates the primary side 105 from the secondary side 107. No electrical connection is present between the primary and secondary sides. The terms "primary" and "secondary" refer to the primary and secondary inductors (also referred to as coils or windings) of the transformer 120.

The primary side 105 includes a voltage input 111. The DC input voltage provided to the voltage input 111 is labeled Vin. The secondary side 107 includes a voltage output 131.

The isolated output voltage from the voltage output 131 is Viso. The primary side 105 includes a primary-side power stage 110. The secondary side 107 includes a rectifier 130. In one example, the rectifier 130 is a full-bridge rectifier comprising four diodes, although other implementations of the rectifier are possible as well. The primary side 105 has a ground Vssp. The secondary side 107 has a ground Vsss. The grounds Vssp and Vsss are isolated from each other.

The transformer 120 has a primary winding 121 and a secondary winding 122. The primary-side power stage 110 receives Vin, and switch nodes VP1 and VP2 of the primary-side power are coupled to the terminals of the primary winding 121 of the transformer 120 as shown. The rectifier 130 is coupled to the secondary winding 122 of the transformer 120. The rectifier 130 converts the time-varying voltage from the secondary winding 122 of the transformer to the DC output voltage Viso. The voltages Vin and Viso do not share the same ground and are galvanically isolated from each other.

Figure 2:
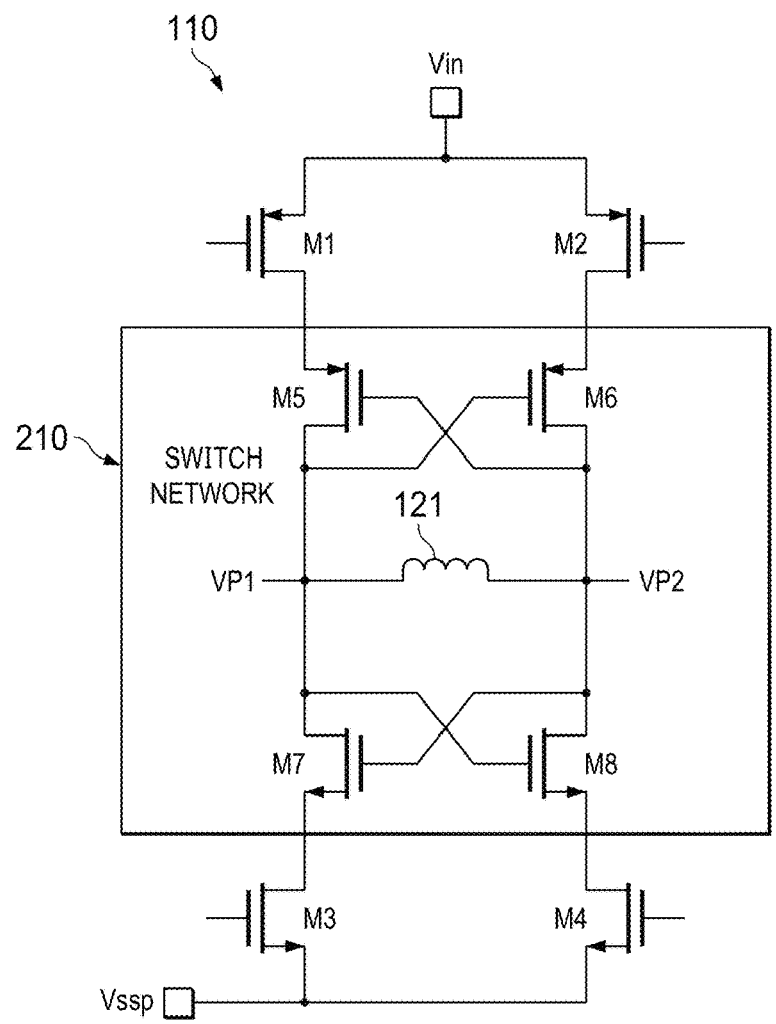
FIG. 2 is a schematic diagram of a power stage within the quasi-resonant voltage converter of FIG. 1, in accordance with an example.

FIG. 2 is a schematic diagram illustrating one example implementation of the primary-side power stage 110. In this example, the primary-side power stage 110 includes transistors M1-M4 and a switch network 210. The switch network 210 includes two pairs of cross-coupled transistors. One pair of cross-coupled transistors includes transistors M5 and M6 and the other pair of cross-coupled transistors includes transistors M7 and M8. M1, M2, M5, and M6 are p-channel field effect transistors (PFETs), and M3, M4, M7, and M8 are n-channel field-effect transistors (NFETs). The sources of M1 and M2 are coupled together and receive Vin. The sources of M3 and M4 are coupled together at ground Vssp. The drain of M1 is coupled to the source of M5, and the drain of M2 is coupled to the source of M6. The gate of M5 is coupled to the drain of M6, and the gate of M6 is coupled to the drain of M5.

The drains of M5 and M7 are coupled together at the switch node VP1, and the drains of M6 and M8 are coupled together at the switch node VP2. The gate of M7 is coupled to the drain of M8, and the gate of M8 is coupled to the drain of M7. The source of M7 is coupled to the drain of M3, and the source of M8 is coupled to the drain of M4. The terminals of the primary winding 121 of the transformer 120 are coupled to the switch nodes VP1 and VP2.

In one embodiment, M1, M2, M3, and M4 are lower voltage-rated transistors than M5, M6, M7, and M8. The voltage rating of the transistor refers to the maximum allowed drain-to source voltage (Vds) and the maximum allowed gate-to-source voltage (Vgs). A lower voltage rated transistor has a better Figure of Merit (FoM) in terms of the product of the on-resistance and the gate charge (Rdson*Qg), which means that lower voltage-rated transistors produce lower loss when switching at a higher frequency compared to a transistor rated for higher voltages. In one specific example, each of M5-M8 are 5V transistors (maximum allowed Vds or Vgs is 5V), and M1-M4 are 1.5V transistors (maximum allowed Vds or Vgs is 1.5V).

M1, M2, M3, and M4 are actively driven through the use of control signals discussed below with reference to FIG. 6. During operation, the control signals are asserted in a manner to cause M2 and M3 to be ON concurrently, while M1 and M4 are OFF, and then to cause M1 and M4 to be ON, while M2 and M3 OFF. The ON and OFF states of M1-M4 repeats—M1 and M4 ON (M2 and M3 OFF), then M2 and M3 ON (M1 and M4 OFF), then M1 and M4 ON again (M2 and M3 OFF), and so on.

The ON and OFF states of the cross-coupled transistors M5/M6 and M7/M8 are controlled as a result of the ON/OFF states of M1-M4. That is, M5-M8 are not actively driven by independently supplied control signals as otherwise is the case for M1-M4. For example, with M2 and M3 ON (and M1 and M4 OFF), M6 and M7 also are ON (and M5 and M8 are OFF). In this portion of each switching cycle, of the eight transistors, M2, M6, M7, and M3 are ON and the remaining transistors are OFF. With M2 and M6 being ON, switch node VP2 is pulled high towards Vin, and with M3 and M7 being ON, switch node VP1 is pulled low towards Vssp. In the opposite state of the switching cycle (M1, M5, M8, and M4 being ON, and M2, M6, M7, and M3 being OFF), switch node VP1 is pulled high towards Vin and switch node VP2 is pulled low towards Vssp.

Figure 3A:
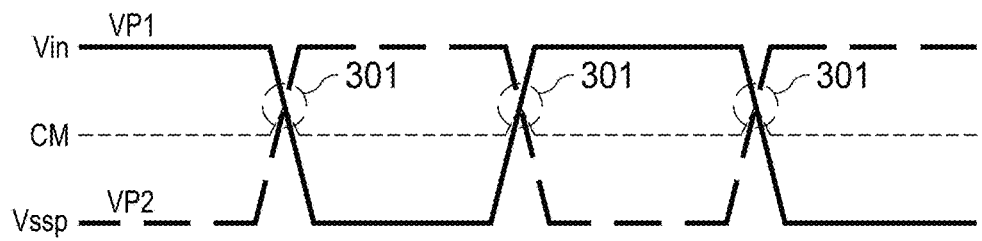
FIG. 3A is a voltage waveform of the switch nodes within the power stage of FIG. 2 illustrating bridge capacitive imbalance due to the parasitic capacitances.

FIG. 3A shows example waveforms for the switch nodes VP1 and VP2 for a conventional primary-side power stage. The common mode voltage (CM) also is shown. The CM voltage is the average of the VP1 and VP2 voltages. When one switch node is at Vin and the other switch node is at Vssp (or close to those voltages), the CM voltage is (Vin−Vssp)/2 (i.e., half-way between Vin and Vssp). In the example of FIG. 3A, the cross-over points 301 at which the VP1 voltage equals the VP2 voltage is larger than (Vin−Vssp)/2 due to asymmetries in a conventional primary-side power stage. The cause of such CM asymmetry is related to the different turn-on mechanisms of the transistors within a conventional primary-side power stage. For example, one conventional power stage includes an upper pair self-driven transistors (couple to VDD) and a lower pair of actively driven transistors couple to ground. Diagonal pairs of transistors (one self-driven and one actively driven) are nominally turned ON simultaneously during each switching cycle. However, the actively driven transistor is turned ON when its drain-to-source voltage is approximately 0V to reduce switching losses, but its diagonal self-driven transistor partner (whose gate is coupled the drain of the actively driven transistor) turns ON earlier (as soon as its gate-to-source voltage reaches the threshold voltage for the transistor. In other words, diagonal pairs of transistors turn ON, but not at exactly the same instance in time, which creates the asymmetry in the voltage waveforms. As a result of the cross-over point being higher than (Vin−Vssp)/2, the CM voltage increases at each cross-over point as shown (or decreases if the cross-over points are below (Vin−Vssp)/2). The increase (or decrease) in the CM voltage at each switching point contributes to higher frequency content in the CM voltage. The higher frequency content in the CM voltage results in EMI generation.

Figure 3B:
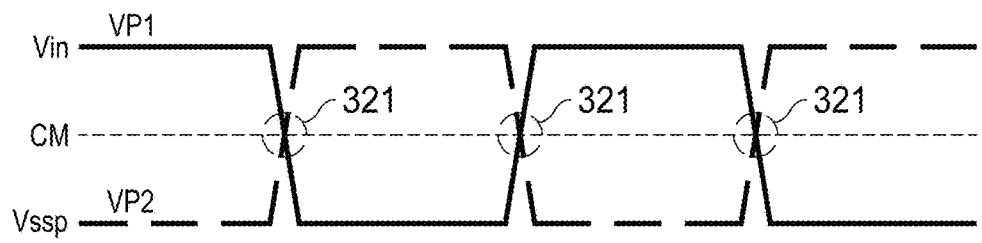
FIG. 3B is a voltage waveform of the switch nodes within a power stage which reduces the effects of capacitive imbalance, in accordance with an example.

The primary-side power stage 110 described herein has an architecture that results in less asymmetry of the switching waveforms. The primary-side power stage 110 described herein has four actively driven transistors that are controlled to increase the symmetry of the voltage waveforms and reduce the CM voltage. FIG. 3B shows the VP1 and VP2 waveforms for the primary-side power stage 110 as described herein. The cross-over points 321 are approximately centered between Vin and Vssp and thus the CM waveform is relatively flat even through the switching points. The CM waveform resulting from the primary-side power stage described herein has relatively little higher frequency content compared to a conventional power stage. As a result, the primary-side power stage 110 contributes to little if any EMI.

Figure 4:
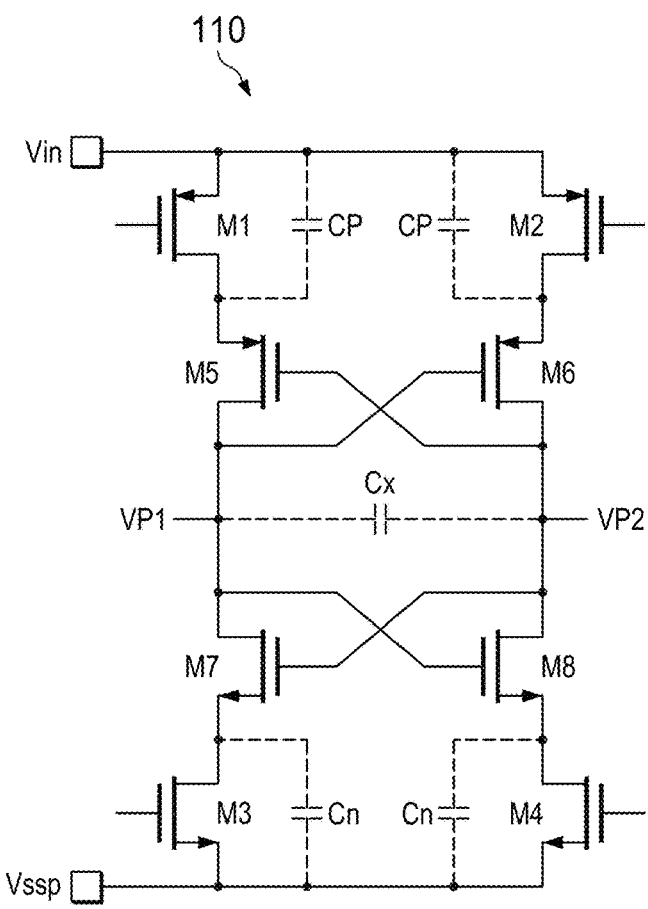
FIG. 4 is a schematic diagram of the power stage of FIG. 2 illustrating parasitic capacitance within the power stage, in accordance with an example.

FIG. 4 illustrates parasitic capacitances within the primary-side power stage 110. Capacitances Cp represents the parasitic capacitances of the drains of respective PFET transistors M1 and M2 when such transistor is OFF). Capacitances Cn represents the parasitic capacitances of the drains of the respective NFET transistors M3 and M4 when such transistor is OFF. Capacitance Cx represents the capacitance across VP1/VP2 when transistors M5-M8 are OFF. Capacitance Cx includes the drain-to-gate capacitances (Cdg) of transistors M5-M8, the series capacitance of the gate-to-source capacitance (Cgs)–Cn and drain-to-source capacitance (Cds)–Cn for the lower-side cross-coupled transistors M7/M8, and Cds–Cp and Cds–Cp for the upper cross-coupled transistors M5 and M6. Because a PFET has a smaller mobility than a comparably sized NFET, the M1 and M2 PFETs are sized larger than the NFETs M3 and M4 so as to have the same or similar on-resistances, which is helpful to balance the design efficiency and mitigate the difference in resistive drop during the ON-time which could otherwise affect the CM in the flat parts of the voltage waveforms. However, larger FETs have larger parasitic capacitance and thus Cp is larger than Cn.

Figure 5:
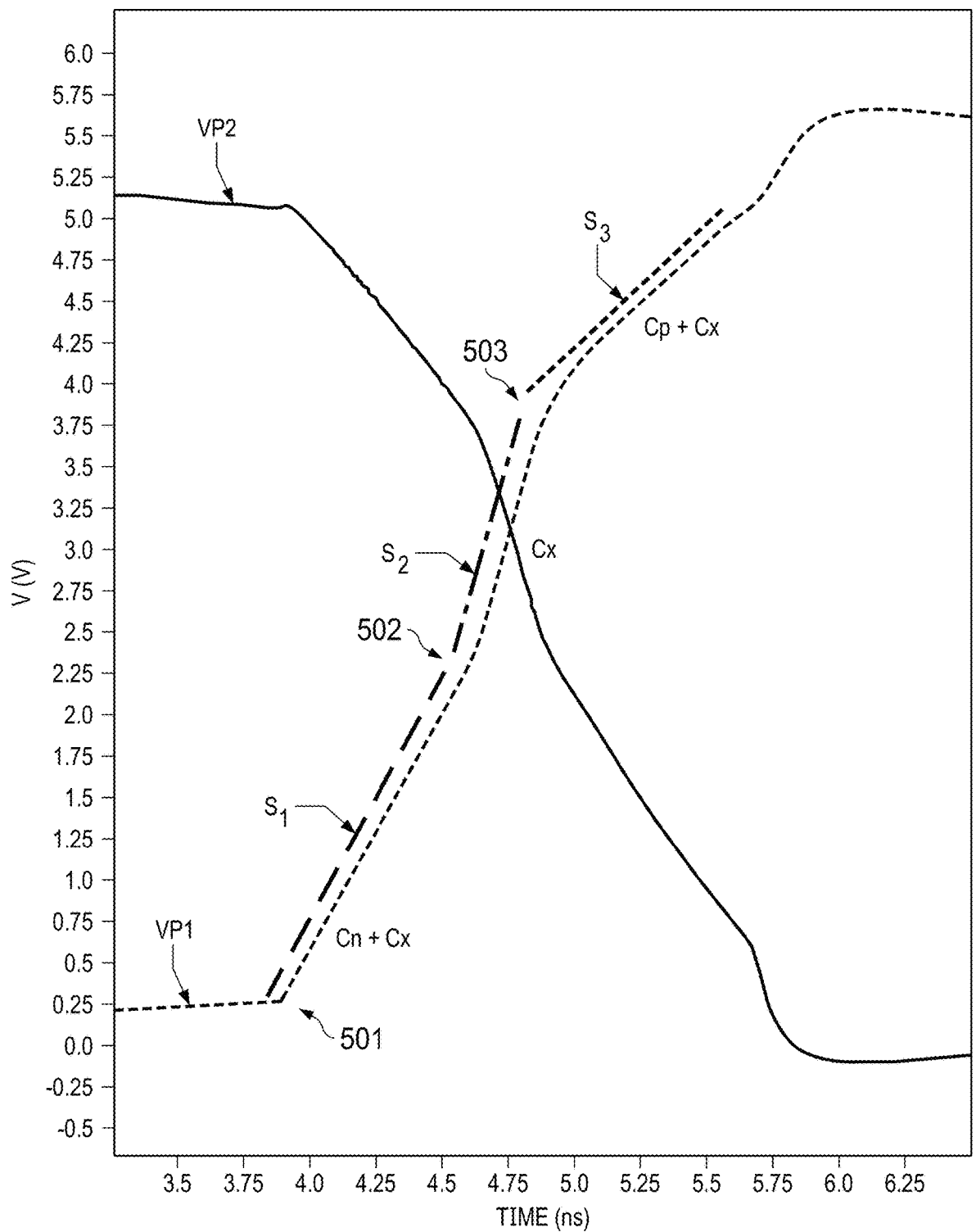
FIG. 5 is a voltage waveform of the switch nodes within the power stage of FIG. 3 further illustrating bridge capacitive imbalance due to the parasitic capacitances.

FIG. 5 shows the waveforms of the switch nodes during the dead-time between two conduction phases at a cross-over point. The slope of VP1 is approximately piece-wise linear from Vssp to Vin. Three different slopes S1, S2, and S3 are identified for VP1. S1 is the slope as VP1 begins to increase with M3 turned OFF (starting at point 501) and M7 beginning to turn OFF. The slope S1 is predominantly influenced (from a parasitic capacitance perspective) by the sum of Cn and Cx. At 502, M7 is fully OFF, and the slope S2 is predominantly influenced to Cx only. At 503, M5 begins to turn ON and the slope S3 is predominantly influenced by the sum of Cp and Cx until M1 turns ON to start the next conduction phase. The waveform of the other switch node VP2 is similar but with the opposite sequencing. Because Cp is larger than Cn, the slope S3 is different than the slope S1. This bridge capacitive imbalance tends to force the cross-over points of the switching node waveforms to deviate from the mid-point between Vin and Vssp towards the upper half.

Figure 6:
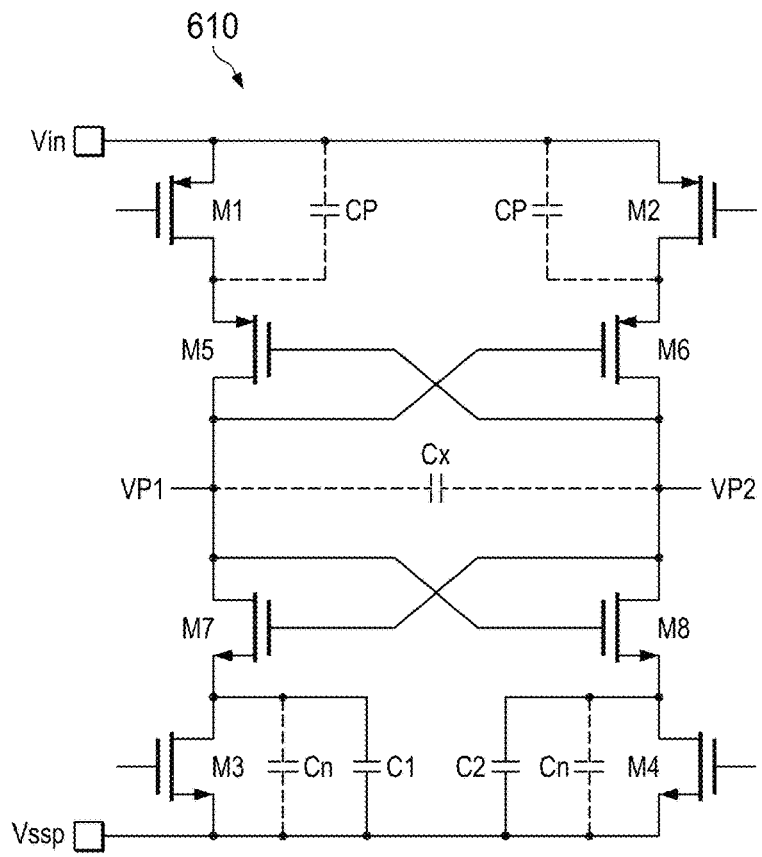
FIG. 6 is a schematic diagram of the power stage including additional capacitors to reduce the effects of bridge capacitive imbalance, in accordance with an example.

FIG. 6 is a schematic diagram of a primary-side power stage 610 usable as the primary-side power stage 110 of FIG. 1. The primary-side power stage 610 is largely the same as that of FIG. 2. Transistors M1-M8 are present and coupled in the same fashion as shown in FIG. 2 and described above. Capacitor devices C1 and C2 are also included. In one embodiment, capacitor devices C1 and C2 are capacitors (e.g., formed as metal layers separated by a dielectric on semiconductor die. In another embodiment, capacitor devices C1 and C2 are metal oxide semiconductor field effect transistors (MOSFETs) in which one terminal is the gate, and the source and drain are connected together to provide the other terminal of the capacitor. In other embodiment, four capacitors are included—a first capacitor across the drain and source of M3, a second capacitor across the drain and gate of M3, a third capacitor across the drain and source of M4, and a fourth capacitor across the drain and gate of M4.

C1 is coupled between the drain and source of M3. C2 is coupled between the drain and source of M4. C1 is thus in parallel with the parasitic capacitance Cn of M3. Similarly, C2 is in parallel with M4's parasitic capacitance. Accordingly, the total capacitance across M3 is (Cn+C1), and the total capacitance across M4 is (Cn+C2). The choice of the magnitude of C1 and C2 is made so that the sum of Cn and the respective capacitor is approximately the same as Cp. The models of the respective FETs indicate the values of Cp and Cn, and C1 and C2 can be calculated based on those values. By including the additional capacitors C1 and C2, the slopes of S1 and S3 can be made to be approximately equal thereby forcing the cross-over points to be closer to the midpoint between Vin and Vssp, thereby reducing the higher frequency content of the CM waveform, which results in lower EMI generation.

Figure 7:
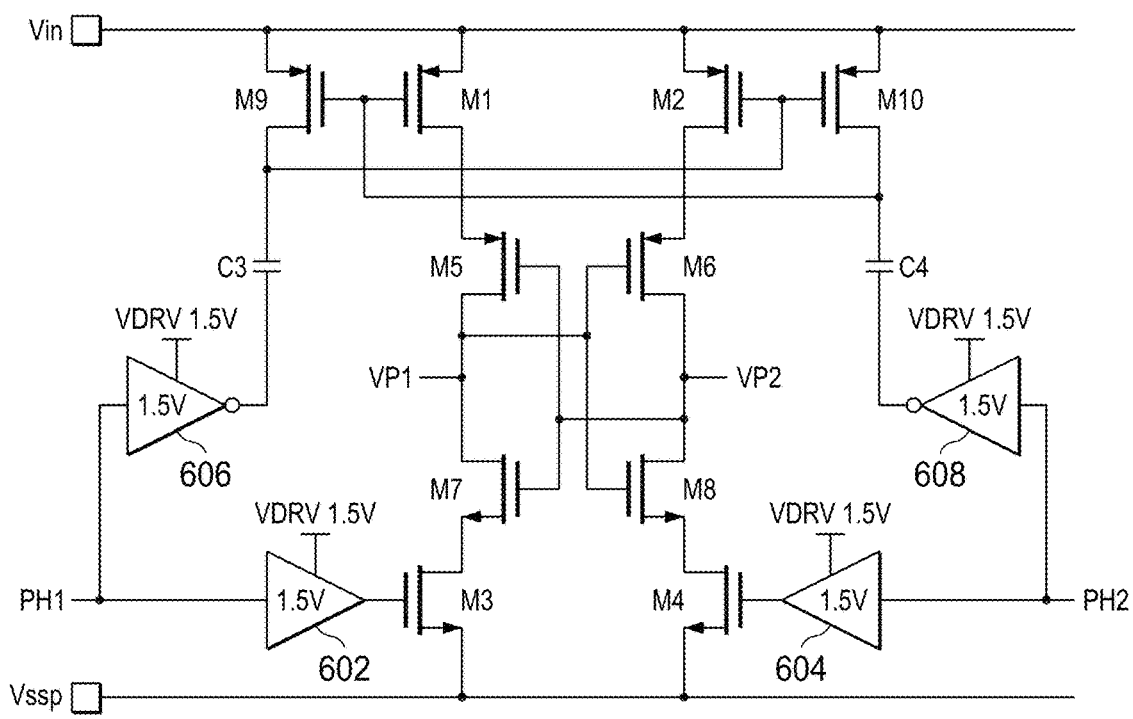
FIG. 7 is a schematic diagram illustrating the drive circuitry for the power stage of the quasi-resonant voltage converter in accordance, with an example.

FIG. 7 is a schematic diagram of the primary-side power stage of FIG. 2 and the drive circuitry for controlling the ON and OFF states of M1-M4. The same drive circuitry can be used for the primary-side power stage of FIG. 6 as well. The drive circuitry includes buffers 602, 604, 606, and 608, capacitors C3 and C4, and transistors M9 and M10. The control signals mentioned above are shown in FIG. 7 as PH1 and PH2. PH1 and PH2 are digital signals having a higher logic state ("1") and a lower logic state ("0"). PH1 and PH2 may be generated by, for example, an oscillator. PH1 and PH2 are at opposite logic states—when PH1 is a 1, PH2 is a 0, and vice versa, and a suitable dead-time is implemented as well.

Buffers 606 and 608 are inverting buffers, and buffers 602 and 604 are non-inverting buffers. The inputs of buffers 602 and 606 receive PH1. The output of buffer 602 is coupled to the gate of M3. The output of buffer 606 is coupled to the lower plate of C3. The upper plate of C3 is coupled to the drain of M9 and to the gates of M2 and M10. M9 and M10 are PFETs and, in some embodiments are smaller than M1 and M2. The inputs of buffers 604 and 608 receive PH2. The output of buffer 604 is coupled to the gate of M4. The output of buffer 608 is coupled to the lower plate of C4. The upper plate of C4 is coupled to the drain of M10 and to the gates of M1 and M9.

Vin can be any voltage in a range of values. In one example, the valid range of values for Vin is from 3V to 5.5V. Buffers 602, 604, 606, and 608 are 1.5V buffers. Accordingly, their output voltages are either approximately 0V or approximately 1.5V. The following explanation assumes PH1 is logic low and PH2 is logic high which causes M1 and M4 to be ON and M3 and M2 to be OFF. With PH1 being logic low, the output of inverting buffer 606 and thus the lower plate of capacitor C3 is at a voltage of approximately 1.5V. The gates and sources of M1 and M9 are coupled together and thus if M1 is on, M9 also is on. With M1 and M9 both being ON, assuming Vin is 5V, then the upper plate of C3 is at a voltage of approximately 5V. Accordingly, the voltage across C3 is approximately 3.5V (5−1.5). The upper plate of C3 is coupled to the gates of M2 and M10, and the voltage of 5V on the upper plate of C3 is too high to turn ON M2 or M10.

After the ON-time has elapsed, PH2 becomes logic low thereby turning OFF M1, M9, and M4 During the next switching event, PH1 changes state from logic low to logic high to turn on M3. Responsive to PH1 now being logic high, inverting buffer 606 forces its output voltage to be approximately 0V. Thus, the voltage on the lower plate of C3 is pulled down from approximately 1.5V to approximately 0V. The voltage across C3, however, maintains the same voltage difference, and thus the voltage on the upper plate of C3 also is pulled down by 1.5V from approximately 5V to 3.5V. The drop in the voltage on the upper plate of C3 also pulls down the voltage on the gates of M2 and M10 to a low enough level to cause M2 and M10 to turn ON. With M10 now being ON, its drain voltage is pulled upward towards Vin. The drain of M10 is coupled to the gates of M1 and M9 and the increase in the voltage on the drain of M10 causes M1 and M9 to remain OFF.

Also, with M10 ON, current flows to C4 to thereby recharge C4. The voltage on the upper plate of C4 is approximately 5V. The voltage on the lower plate of C4 is approximately 1.5V, as a result of the output voltage from inverting buffer 608 being approximately 1.5 while PH2 is logic low.

The operation of the drive circuitry is largely the same in the next switching event when PH1 changes from logic high to low and PH2 changes from logic low to high. The decrease in voltage on the lower plate of C4 causes a commensurate decrease in the voltage on the upper plate of C4 which causes M1 and M9 to turn ON. M9 turning ON, in turn, causes the voltage on the gates of M2 and M10 to be forced high enough to turn OFF M2 and M10.

The drive circuitry of FIG. 7 advantageously does not require active level shifters for the gate voltages of the PFETs M1 and M2. Further, only two digital control signals are needed to operate all four transistors M1-M4. Further, the drive buffers 602, 604, 606, and 608 all share the same voltage supply, which reduces the source of possible delay mismatches in the PFET versus NFET gate drive signals.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)). Furthermore, the devices may be implemented in/over a silicon substrate (Si), a silicon carbide substrate (SiC), a gallium nitride substrate (GaN) or a gallium arsenide substrate (GaAs).

References herein to a field effect transistor (FET) being "ON" means that the conduction channel of the FET is present and drain current may flow through the FET. References herein to a FET being "OFF" means that the conduction channel is not present and drain current does not flow through the FET. A FET that is OFF, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A voltage converter, comprising:
  a transformer having a first winding and a second winding, the first winding having first and second winding terminals;
  a switch network having a first, second, third, fourth, fifth, and sixth switch network terminals, the first switch network terminal coupled to the first winding terminal, and the second switch network terminal coupled to the second winding terminal;
  a first transistor having a control terminal and a current terminal, the current terminal coupled to the third switch network terminal;
  a second transistor having a control terminal and a current terminal, the current terminal coupled to the fourth switch network terminal;
  a third transistor having a control terminal and a current terminal, the current terminal coupled to the fifth switch network terminal;
  a fourth transistor having a control terminal and a current terminal, the current terminal coupled to the sixth switch network terminal;
  wherein the switch network comprises:
    a fifth transistor having a first current terminal, a second current terminal, and a control terminal, the first current terminal coupled to the third switch network terminal, and the second current terminal coupled to the first switch network terminal;
    a sixth transistor having a control terminal, a first current terminal, and a second current terminal, the first current terminal coupled to the fourth switch network terminal, the second current terminal coupled to the control terminal of the fifth transistor and to the second switch network terminal, and the control terminal coupled to the second current terminal of the fifth transistor;

a seventh transistor having a first current terminal, a second current terminal, and a control terminal, the first current terminal coupled to the fifth switch network terminal, and the second current terminal coupled to the first switch network terminal; and an eighth transistor having a first current terminal, a second current terminal, and a control terminal, the first current terminal coupled to the sixth switch network terminal, the second current terminal coupled to the second switch network terminal and to the control terminal of the seventh transistor, and the control terminal coupled to the second current terminal of the seventh transistor;

wherein during a first time period, responsive to receiving a first control signal at the control terminal of the first transistor, receiving a second control signal at the control terminal of the second transistor, receiving a third control signal at the control terminal of the third transistor, and receiving a fourth control signal at the control terminal of the fourth transistor, the second transistor, the third transistor, the sixth transistor, and the seventh transistor are configured to be on and the first transistor, the fourth transistor, the fifth transistor, and the eighth transistor are configured to be off; and wherein during a second time period, responsive to receiving a fifth control signal at the control terminal of the first transistor, receiving a sixth control signal at the control terminal of the second transistor, receiving a seventh control signal at the control terminal of the third transistor, and receiving an eighth control signal at the control terminal of the fourth transistor, the second transistor, the third transistor, the sixth transistor, and the seventh transistor are configured to be off and the first transistor, the fourth transistor, the fifth transistor, and the eighth transistor are configured to be on.

2. The voltage converter of claim 1, wherein the first, second, third, and fourth transistors are lower voltage-rated transistors than the fifth transistor, the sixth transistor, the seventh transistor, and the eighth transistor.

3. The voltage converter of claim 1, further comprising:
a first buffer having a first buffer input and a first buffer output;
a second buffer having a second buffer input and a second buffer output, the second buffer output coupled to the control terminal of the third transistor, the first and second buffer inputs are coupled together and adapted to receive a ninth control signal;
a third buffer having a third buffer input and a third buffer output;
a fourth buffer having a fourth buffer input and a fourth buffer output, the fourth buffer output coupled to the control terminal of the fourth transistor, the third and fourth buffer inputs are coupled together and adapted to receive a tenth control signal;
a third capacitor coupled between the control terminal of the second transistor and the first buffer output; and
a fourth capacitor coupled between the control terminal of the first transistor and the third buffer output.

4. The voltage converter of claim 3, wherein each of the first and third buffers are inverting buffers, and each of the second and fourth buffers are non-inverting buffers.

5. The voltage converter of claim 3, further comprising:
a ninth transistor having a current terminal and a control terminal, the control terminal coupled to the control terminal of the first transistor, and the current terminal coupled to the third capacitor; and
a tenth transistor having a control terminal and a current terminal, the control terminal coupled to the control terminal of the second transistor, and the current terminal coupled to the fourth capacitor.

6. The voltage converter of claim 1, wherein the current terminal of the third transistor is a first current terminal and the current terminal of the fourth transistor is a first current terminal, the voltage converter further comprising:
a first capacitive device having a first capacitor terminal and a second capacitor terminal, the first capacitor terminal coupled to the first current terminal of the third transistor and the second capacitor terminal coupled to a second terminal of the third transistor; and
a second capacitive device having a first capacitor terminal and a second capacitor terminal, the first capacitor terminal coupled to the first current terminal of the fourth transistor and the second capacitor terminal coupled to a second terminal of the fourth transistor.

7. A circuit comprising:
a first transistor having a control terminal and a current terminal;
a second transistor having a control terminal and a current terminal;
a third transistor having a control terminal and a current terminal;
a fourth transistor having a control terminal and a current terminal;
a fifth transistor having a first current terminal, a second current terminal, and a control terminal, the first current terminal coupled to the current terminal of the first transistor;
a sixth transistor having a first current terminal, a second current terminal, and a control terminal, the first current terminal coupled to the current terminal of the second transistor, the second current terminal coupled to the control terminal of the fifth transistor, and the control terminal coupled to the second current terminal of the fifth transistor;
a seventh transistor having a first current terminal, a second current terminal, and a control terminal, the first current terminal coupled to the current terminal of the third transistor, and the second current terminal coupled to the second current terminal of the fifth transistor; and
an eighth transistor having a first current terminal, a second current terminal, and a control terminal, the first current terminal coupled to the current terminal of the fourth transistor, the second current terminal coupled to the second current terminal of the sixth transistor and to the control terminal of the seventh transistor, and the control terminal coupled to the second current terminal of the seventh transistor;
wherein during a first time period, responsive to receiving a first control signal at the control terminal of the first transistor, receiving a second control signal at the control terminal of the second transistor, receiving a third control signal at the control terminal of the third transistor, and receiving a fourth control signal at the control terminal of the fourth transistor, the second transistor, the third transistor, the sixth transistor, and the seventh transistor are configured to be on and the first transistor, the fourth transistor, the fifth transistor, and the eighth transistor are configured to be off; and wherein during a second time period, responsive to receiving a fifth control signal at the control terminal of the first transistor, receiving a sixth control signal at the control terminal of the second transistor, receiving a seventh control signal at the control terminal of the third transistor, and receiving an eighth control signal at the control terminal of the fourth transistor, the second transistor, the third transistor, the sixth transistor, and the seventh transistor are configured to be off and the first transistor, the fourth transistor, the fifth transistor, and the eighth transistor are configured to be on.

8. The circuit of claim 7, wherein:
the first transistor is a p-channel field-effect transistor (PFET);
the second transistor is a PFET;
the third transistor is an n-channel field-effect transistor (NFET); and
the fourth transistor is an NFET.

9. The circuit of claim 7, further comprising:
a first buffer having a first buffer input and a first buffer output;
a second buffer having a second buffer input and a second buffer output, the second buffer output coupled to the control terminal of the third transistor, the first and second buffer inputs are coupled together and adapted to receive a ninth control signal;
a third buffer having a third buffer input and a third buffer output;
a fourth buffer having a fourth buffer input and a fourth buffer output, the fourth buffer output coupled to the control terminal of the fourth transistor, the third and fourth buffer inputs are coupled together and adapted to receive a tenth second control signal;
a third capacitor coupled between the control terminal of the second transistor and the first buffer output; and
a fourth capacitor coupled between the control terminal of the first transistor and the third buffer output.

10. The circuit of claim 9, further comprising:
a ninth transistor having a current terminal and a control terminal, the control terminal coupled to the control terminal of the first transistor, and the current terminal coupled to the third capacitor; and
a tenth transistor having a control terminal and a current terminal, the control terminal coupled to the control terminal of the second transistor, and the current terminal coupled to the fourth capacitor.

11. The circuit of claim 7, in which the first, second, third, and fourth transistors are lower voltage-rated transistors than the fifth, sixth, seventh, and eighth transistors.

12. The circuit of claim 7, further comprising an inductor having a first inductor terminal and a second inductor terminal, the first inductor terminal coupled to the second current terminal of the fifth transistor, to the control terminal of the sixth transistor, to the second current terminal of the seventh transistor, and to the control terminal of the eight transistor, and the second inductor terminal is coupled to the second current terminal of the sixth transistor, to the control terminal of the fifth transistor, to the second current terminal of the eight transistor, and to the control terminal of the seventh transistor.

13. The circuit of claim 7, wherein the current terminal of the third transistor is a first current terminal, the current terminal of the fourth transistor is a first current terminal, the circuit further comprising:
a first capacitive device having a first terminal and a second terminal, the first terminal coupled to the first current terminal of the third transistor and the second terminal coupled to a second current terminal of the third transistor; and
a second capacitive device having a first terminal and a second terminal, the first terminal coupled to the first current terminal of the fourth transistor and the second terminal coupled to a second current terminal of the fourth transistor.

14. A voltage converter, comprising:
a transformer having a primary winding and a secondary winding, the primary winding having first and second winding terminals;
a switch network having a first, second, third, fourth, fifth, and sixth switch network terminals, the first switch network terminal coupled to the first winding terminal, and the second switch network terminal coupled to the second winding terminal;
a first field-effect transistor (FET) having a first gate, first drain, and a first source, the first drain coupled to the third switch network terminal;
a second FET having a second gate, a second drain, and a second source, the second drain coupled to the fourth switch network terminal;
a third FET having a third gate, a third drain, a third source, the third drain coupled to the fifth switch network terminal; and
a fourth FET having a fourth gate, a fourth drain, and a fourth source, the fourth drain coupled to the sixth switch network terminal, and wherein the switch network comprises:
a fifth FET having a fifth gate, a fifth source, and a fifth drain, the fifth source coupled to the first drain;
a sixth FET having a sixth gate, a sixth source, and a sixth drain, the sixth source coupled to the second drain, the sixth gate coupled to the fifth drain, and the sixth drain coupled to the fifth gate;
a seventh FET having a seventh gate, a seventh source, and a seventh drain, the seventh drain coupled to the fifth drain and the seventh source coupled to the third drain; and
an eighth FET having an eighth gate, an eighth source, and an eighth drain, the eighth drain coupled to the sixth drain and to the seventh gate, the eighth gate coupled to the seventh drain, and the eighth source coupled to the fourth drain;
wherein during a first time period, responsive to receiving a first control signal at the first gate, receiving a second control signal at the second gate, receiving a third control signal at the third gate, and receiving a fourth control signal at the fourth gate, the second FET, the third FET, the sixth FET, and the seventh FET are configured to be on and the first FET, the fourth FET, the fifth FET, and the eighth FET are configured to be off; and
wherein during a second time period, responsive to receiving a fifth control signal at the first gate, receiving a sixth control signal at the second gate, receiving a seventh control signal at the third gate, and receiving an eighth control signal at the fourth gate, the second FET, the third FET, the sixth FET, and the seventh FET are configured to be off and the first FET, the fourth FET, the fifth FET, and the eighth FET are configured to be on.

15. The voltage converter of claim 14, further comprising:
a first capacitive device coupled between the third drain and the third source; and a second capacitive device coupled between the fourth drain and the fourth source.

16. The voltage converter of claim 14, in which a drain-to-source voltage (Vds) rating of the first through fourth FETs is smaller than a Vds rating of the fifth through eighth FETS.

17. The voltage converter of claim 14, in which the first through fourth FETs are configured to be controlled by a pair of control signals.

* * * * *